United States Patent
Watanabe et al.

(10) Patent No.: US 7,650,784 B2
(45) Date of Patent: Jan. 26, 2010

(54) THERMAL TYPE FLOW RATE MEASURING APPARATUS

(75) Inventors: Izumi Watanabe, Hitachinaka (JP); Junichi Horie, Hitachinaka (JP); Keiichi Nakada, Hitachinaka (JP); Kei Ueyama, Asuka (JP); Masamichi Yamada, Hitachinaka (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 0 days.

(21) Appl. No.: 12/139,761

(22) Filed: Jun. 16, 2008

(65) Prior Publication Data

US 2008/0250856 A1 Oct. 16, 2008

Related U.S. Application Data

(63) Continuation of application No. 11/505,987, filed on Aug. 18, 2006, now Pat. No. 7,395,707, which is a continuation of application No. 11/187,823, filed on Jul. 25, 2005, now Pat. No. 7,104,126, which is a continuation of application No. 10/449,117, filed on Jun. 2, 2003, now Pat. No. 6,925,866.

(30) Foreign Application Priority Data

Jun. 10, 2002 (JP) .............................. 2002-168008

(51) Int. Cl.
*G01F 1/68* (2006.01)

(52) U.S. Cl. .................................. 73/204.26

(58) Field of Classification Search .............. 73/204.26, 73/204.25, 204.16, 204.11, 204.23
See application file for complete search history.

(56) References Cited

U.S. PATENT DOCUMENTS

| | | | |
|---|---|---|---|
| 5,086,650 A | 2/1992 | Harrington et al. | |
| 6,557,411 B1 | 5/2003 | Yamada et al. | |
| 6,805,003 B2 * | 10/2004 | Ueki et al. | ............... 73/204.26 |
| 6,889,544 B2 * | 5/2005 | Tanimoto et al. | ......... 73/204.15 |
| 6,925,866 B2 | 8/2005 | Watanabe et al. | |
| 7,104,126 B2 | 9/2006 | Watanabe et al. | |
| 2005/0000281 A1 | 1/2005 | Konzelmann et al. | |

FOREIGN PATENT DOCUMENTS

| | | |
|---|---|---|
| DE | 100 35 665 A1 | 6/2001 |
| EP | 0 561 365 A2 | 9/1993 |

(Continued)

*Primary Examiner*—Jewel Thompson
(74) *Attorney, Agent, or Firm*—Brundidge & Stanger, P.C.

(57) ABSTRACT

A flow rate sensor has a problem that a resistance value of a heat generating resistor itself varies and sensor characteristics are changed during use of the sensor for a long term. Also, the temperature of the heat generating resistor must be adjusted on a circuit substrate with a resistance constituting one side of a fixed temperature difference control circuit, and this has been one of factors pushing up the production cost. All resistances used for fixed temperature difference control are formed on the same substrate as temperature sensitive resistors of the same material. This enables all the resistances for the fixed temperature difference control to be exposed to the same environmental conditions. Hence, even when the resistances change over time, the changes over time occur substantially at the same tendency. Since the resistances for the fixed temperature difference control change over time essentially at the same rate, a resulting output error is very small.

8 Claims, 11 Drawing Sheets

FOREIGN PATENT DOCUMENTS

| | | |
|---|---|---|
| JP | 5-142008 | 6/1993 |
| JP | 05-164583 | 6/1993 |
| JP | 05-264314 | 10/1993 |
| JP | 6-63801 | 8/1994 |
| JP | 07-320907 | 12/1995 |
| WO | WO 02/21084 | 3/2002 |

* cited by examiner

FIG.23

⟨TABLE 1⟩

| EXAMPLE ACCORDING TO INVENTION | | PRIOR ART | |
|---|---|---|---|
| VARIATION OF BRIDGE RESISTANCE *1 AT FIXED TEMPERATURE DIFFERENCE (at 0°C) | VARIATION OF HEATING TEMPERATURE | VARIATION OF BRIDGE RESISTANCE *2 AT FIXED TEMPERATURE DIFFERENCE (at 0°C) | VARIATION OF HEATING TEMPERATURE |
| Rh=200 Ω ±30%<br>Rc=5000 Ω ±30%<br>Ra=50 Ω ±30%<br>Rb=970 Ω ±30%<br>Rh/Rc   ±0.07%<br>Ra/Rb   ±0.07% | ABOUT 170°C<br>±1°C<br>(AT AMBIENT TEMPERATURE OF 20°C) | Rh=200 Ω ±30%<br>Rc=5000 Ω ±30%<br>Ra=50 Ω ±1%<br>Rb=970 Ω ±1%<br>Rh/Rc   ±0.07%<br>Ra/Rb   ±2% | ABOUT 170°C<br>±14°C<br>(AT AMBIENT TEMPERATURE OF 20°C) |

*1: RESISTANCE TEMPERATURE COEFFICIENTS OF Rh,Rc,Ra,Rb ARE 2000ppm/°C
*2: RESISTANCE TEMPERATURE COEFFICIENTS OF Rh,Rc,ARE 2000ppm/°C
    RESISTANCE TEMPERATURE COEFFICIENTS OF Ra,Rb,ARE 0ppm/°C

FIG.24

⟨TABLE 2⟩

| EXAMPLE ACCORDING TO INVENTION | | PRIOR ART | |
|---|---|---|---|
| RESISTANCE TEMPERATURE COEFFICIENT α OF BRIDEG RESISTANCE *1 AT FIXED TEMPERATURE DIFFERENCE | VARIATION OF HEATING TEMPERATURE | RESISTANCE TEMPERATURE COEFFICIENT α OF BRIDEG RESISTANCE *1 AT FIXED TEMPERATURE DIFFERENCE | VARIATION OF HEATING TEMPERATURE |
| αRh=2000±20ppm/°C<br>αRc=2000±20ppm/°C<br>αRa=2000±20ppm/°C<br>αRb=2000±20ppm/°C<br>αRh-αRc=±2ppm/°C<br>αRs-αRb=±2ppm/°C | ABOUT 170°C ±2°C (AT AMBIENT TEMPERATURE OF 20°C)<br><br>ABOUT 247°C ±2°C (AT AMBIENT TEMPERATURE OF 80°C) | αRh=2000±20ppm/°C<br>αRc=2000±20ppm/°C<br>αa=0±50ppm/°C<br>αb=0±50ppm/°C<br>αRh-αRc=±2ppm/°C<br>αs-αb=±50ppm/°C | ABOUT 170°C ±3°C (AMBIENT TEMPERATURE OF 20°C)<br><br>ABOUT 247°C ±8°C (AT AMBIENT TEMPERATURE OF 80°C) |

*1: Rh=200Ω, Rc=5000Ω, Ra=50Ω, Rb=970Ω (at 0°C)

THERMAL TYPE FLOW RATE MEASURING APPARATUS

This application is a continuation of U.S. application Ser. No. 11/505,987 filed Aug. 18, 2006, now U.S. Pat. No.7,395,707 now allowed, which is a continuation of U.S. application Ser. No. 11/187,823, filed Jul. 25, 2005, now U.S. Pat. No. 7,104,126, which is a continuation of U.S. application Ser. No. 10/449,117, filed Jun. 2, 2003, now U.S. Pat. No. 6,925,866, the entirety of which are incorporated herein by reference.

BACKGROUND OF THE INVENTION

1. Field of the Invention

The present invention relates to a apparatus for detecting a flow rate, and more particularly to, for example, a flow sensor for use in an internal combustion engine or a flow sensor for use in a fuel battery system.

2. Description of the Related Art

Hitherto, as air flow sensors disposed in intake air passages of internal combustion engines of automobiles, etc. for measuring the amounts of intake air, thermal ones have been primarily employed because of a capability of directly detecting air mass flow rates. Recently, air flow sensors manufactured by semiconductor micromachining techniques, in particular, have received attention because they have a high-speed response and are able to detect a back flow by utilizing the high-speed response.

One example of the conventional technique regarding such a thermal type air flow sensor using a semiconductor substrate is disclosed in, e.g., Japanese Publication of Examined Patent Application No. 6-63801. In the related art, an electric current is supplied to a heater resistance arranged between an upstream-side temperature sensor and a downstream-side temperature sensor for generating heat, and a flow rate signal is obtained depending on a difference in output signal between the upstream-side temperature sensor and the downstream-side temperature sensor.

SUMMARY OF THE INVENTION

The related art, however, has a problem that the resistance value of a heat generating resistor itself is changed with heating of the heat generating resistor, which is formed in a thin wall portion.

In view of the above problem, it is proposed to provide a compensating means in a control circuit so that flow rate characteristics will not change even with changes of the resistance value, as described in the above-cited Japanese Publication of Examined Patent Application No. 6-63801.

However, such a proposal raises problems that the circuit structure is complicated and the sensor structure is also complicated. Further, no considerations are paid to time-dependent changes of parts mounted on a circuit board.

Moreover, for control of the temperature of the heat generating resistance, a resistance constituting one side of a fixed temperature difference bridge must be adjusted on the circuit board. This necessity has been one of factors pushing up the production cost.

Furthermore, a fixed resistance used in the fixed temperature difference bridge, which is formed on the circuit board, in fact has a slight resistance temperature coefficient, and the heating temperature of the heat generating resistor varies when the ambient temperature is changed with a variation in the resistance temperature coefficient, thus resulting in a variation in temperature characteristics.

Also, the fixed resistance is itself changed over time, which causes characteristic changes.

In addition, recently, a demand for protection against electromagnetic interference has enlarged and the necessity of improving durability against electromagnetic interference has increased.

In the view of the above-mentioned problems in the related art, it is an object of the present invention to provide a thermal type flow measuring device, which is inexpensive and has high reliability.

The above object is achieved with the features of the present invention set forth in Claims.

More specifically, by forming resistors, which constitute a fixed temperature difference control circuit, as temperature sensitive resistors, the resistors can be caused to change their resistances at the same tendency if the resistance changes should occur over time.

When resistance values of the resistors for the fixed temperature difference control change over time at the same rate, a resulting output error is very small and therefore reliability can be improved. As the fixed temperature difference control circuit, a bridge circuit is preferably employed because it is of a relatively simple structure and has superior advantages.

Also, with the fixed temperature difference control circuit formed using identical temperature sensitive resistors, these components can be formed at a time in the same manufacturing process and the above structure is more cost effective. In particular, a variation in resistance temperature coefficients of the temperature sensitive resistors can be reduced and therefore a variation in temperature characteristics can be reduced correspondingly.

Since the heat generating resistor is also formed in the fixed temperature difference control circuit, the circuit configuration is simplified, which is advantageous in reducing the apparatus size.

Since resistances for the fixed temperature difference control, including those ones which have been mounted on a separate circuit board in the past, are all formed on one substrate, lengths of wiring for connection between the resistances can be minimized. Hence, a wiring section is less likely to serve as an antenna and is very endurable against electromagnetic interference.

When the thermal type flow measuring apparatus is applied to an automobile, it is mounted in an engine room. In such a case, a region near a sensor section, which is less subjected to heat radiation from an engine and is exposed to intake air, is more advantageous from the viewpoint of temperature environmental conditions. By forming the resistances for the fixed temperature difference control on one substrate together with the heat generating resistor and arranging the substrate to be exposed to a fluid, the present invention is advantageously implemented for the purpose of compensation of resistance changes over time.

Further, by forming the resistances for the fixed temperature difference control in the same manufacturing process, the resistance ratio can be always controlled constant in spite of absolute values of the resistances having a large variation. With the resistance ratio held constant, the fixed temperature difference control circuit can be manufactured without adjustments to be substantially free from a variation in the heating temperature of the heat generating resistor.

As a result, operations, such as laser trimming, for adjusting the heating temperature of the heat generating resistor, which have been required in the past, are no longer required, and manufacturing steps can be simplified.

BRIEF DESCRIPTION OF THE DRAWINGS

FIG. 23 is a table for explaining an advantage of the thermal type flow measuring apparatus according to the present invention; and FIG. 24 is a table for explaining an advantage of the thermal type flow measuring apparatus according to the present invention.

DESCRIPTION OF THE PREFERRED EMBODIMENTS

Preferred embodiments of the present invention will be described below with reference to the drawings.

Figure 1:
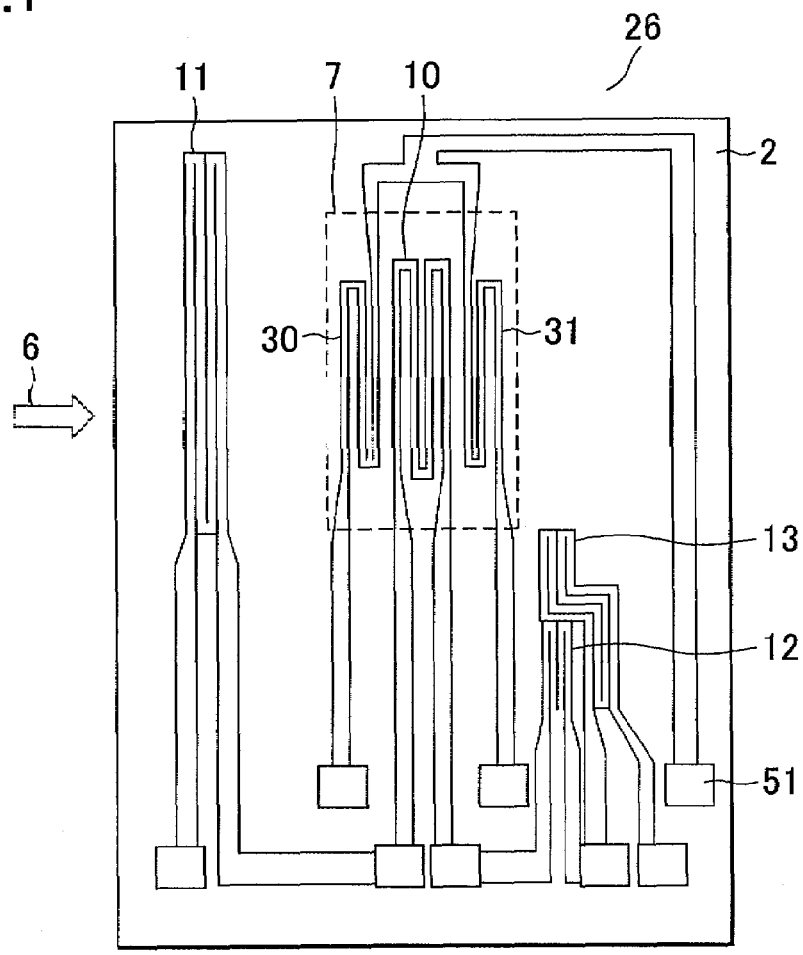
FIG. 1 is a wiring pattern diagram of a thermal type flow sensor according to one embodiment of the present invention.
Figure 2:
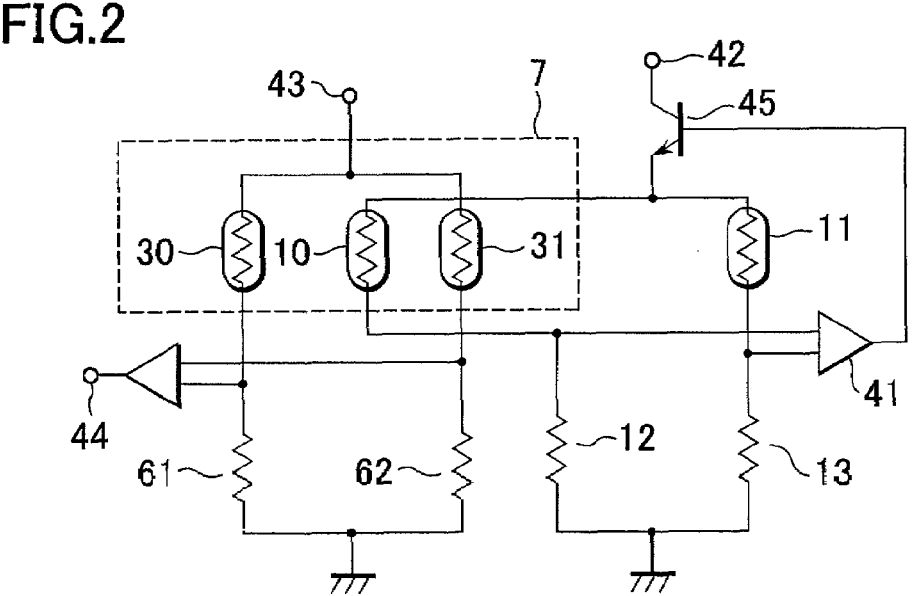
FIG. 2 is a circuit diagram including the thermal type flow sensor shown in FIG. 1.
Figure 3:
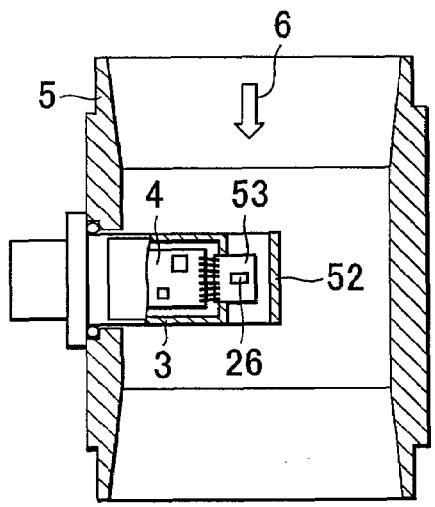
FIG. 3 is a sectional view showing a thermal type flow measuring apparatus including the thermal type flow sensor shown in FIG. 1.

FIG. 1 is a diagram showing a structure and a wiring pattern of a thermal type flow sensor 26 used in a thermal type flow measuring apparatus 1 according to one embodiment of the present invention. FIG. 2 is a circuit diagram including the thermal type flow sensor 26 shown in FIG. 1. FIG. 3 is a sectional view showing a state in which the thermal type flow measuring apparatus 1 is actually mounted in an intake pipe of an internal combustion engine. A description is made of one embodiment of the present invention with reference to FIGS. 1, 2 and 3.

As shown in FIG. 1, the thermal type flow sensor 26 is of a structure that a thin wall portion 7 is formed in a substrate 2 of a semiconductor, etc., and a heat generating resistor 10, an upstream-side temperature sensor 30 and a downstream-side temperature sensor 31 are arranged in the thin wall portion 7 to be thermally insulated from the substrate 2. Then, temperature sensitive resistors 11, 12 and 13 are formed of the same material as that of the heat generating resistor 10. Each of these resistors 10 to 13 has an electrode 51 made of, e.g., aluminum for electrical connection to the outside. The substrate 2 of a semiconductor, etc. is formed of, e.g., silicon. The thin wall portion 7 is obtained by forming a cavity in the substrate 2 from its rear side with anisotropic etching using an etchant such as potassium hydroxide. In the thermal type flow sensor 26 thus constructed, the substrate 2 has dimensions of about 2.5 mm×6 mm×0.3 mm, and the thin wall portion 7 has dimensions of about 0.5 mm×1 mm and a thickness of about 0.0015 mm. The temperature sensitive resistors are each generally made of a resistor formed by doping impurities in poly- or single-crystalline silicon, or made of platinum, gold, copper, aluminum, chromium, nickel, tungsten, Permalloy (FeNi), titanium, etc.

As shown in FIG. 2, the heat generating resistor 10 constitutes a bridge circuit in cooperation with the temperature sensitive resistors 11, 12 and 13. The heating temperature of the heat generating resistor 10 is decided based on resistance values of the temperature sensitive resistors 11, 12 and 13. The heating of the heat generating resistor 10 is controlled so as to hold it substantially at a fixed temperature difference $\Delta T$ relative to the ambient temperature under feedback control using a differential amplifier 41, a transistor 45, etc., and if the ambient temperature is the same, the heating control is performed so as to hold the heat generating resistor 10 substantially at a fixed temperature regardless of a flow rate. More specifically, in the case of the heat generating resistor 10 which is controlled to be held at $\Delta T$ of 150° C., for example, the heating temperature is about 170° C. when the ambient temperature is 20° C., and it is about 250° C. when the ambient temperature is 100° C.

The heating temperature of the heat generating resistor 10 is controlled to be held substantially the same in spite of changes of the flow rate. Hereinafter, that type of control method is referred to simply as a fixed temperature difference control method, and a circuit for realizing such a control method is referred to as a fixed temperature difference bridge or a fixed temperature difference control circuit in this specification.

An output 44 of the thermal type flow measuring apparatus 1 can be obtained by a temperature sensor bridge made up of temperature sensors 30, 31, which are formed respectively upstream and downstream of the heat generating resistor 10, and fixed resistances 61, 62. Stated otherwise, in a state of no air flow, because the upstream-side temperature sensor 30 and the downstream-side temperature sensor 31 are subjected to the same temperature, the output 44 is zero when the resistance values of the upstream-side and downstream-side temperature sensors 30, 31 are equal to each other and the resistance values of the fixed resistances 61, 62 are equal to each other.

When there occurs a flow and a fluid flow 6 is caused in a direction from the upstream to downstream side, for example, as shown in FIG. 1, the upstream-side temperature sensor 30 is cooled while the temperature of the downstream-side temperature sensor 31 conversely rises upon receiving heat generated by the heat generating resistor 10. This causes a difference between the resistance values of the upstream-side and downstream-side temperature sensors 30, 31, whereby the output 44 indicative of the flow rate is produced. Likewise, when there occurs a fluid flow from the downstream to upstream side, the output 44 is changed in a direction reversal to that in the above case. It is hence possible to detect the flow rate of a fluid including a back flow.

The thermal type flow measuring apparatus 1 of the present invention is used, for example, to detect the flow rate of intake air in an internal combustion engine and to supply fuel in match with the detected air flow rate. To that end, the thermal type flow measuring apparatus 1 is disposed between an air cleaner 102 and a throttle body 109 (see FIG. 21) in an engine room, and includes a circuit board 4, a housing 3, etc. as shown in FIG. 3. A sub-passage 52 is formed in a main passage 5, and the thermal type flow sensor 26 is disposed in the sub-passage 52.

At the startup of engine operation, the temperature is equal to that of open air and the temperature of intake air is in the range of −30° C. to 40° C. After the start of warming-up, however, the temperature at the surface of the main passage 5 rises to about 125° C. at maximum and the temperature of intake air rises to about 100° C. at maximum because of an effect of heat generated from the engine. For that reason, the thermal type flow measuring apparatus 1 is required to cause no output errors over a wide temperature range of −30° C. to 100° C. or 125° C. In a conventional thermal type flow measuring apparatus (corresponding to 1), a part of resistances of a fixed temperature difference bridge for controlling a heat generating resistor (corresponding to 10) to be kept at a fixed temperature difference is formed as a fixed resistance on a circuit board (corresponding to 4). In spite of being the fixed resistance, however, its resistance temperature coefficient is not perfectly zero, and even the fixed resistance generally has a resistance temperature coefficient of about 0±50 ppm. Such a variation in the resistance temperature coefficient makes the bridge out of balance upon a change of the ambient temperature and is one of factors causing a variation in temperature characteristics.

Also, it is assumed in cold districts that an engine is warmed up in a garage and an automobile starts traveling after the warming-up. In this case, immediately after the start of traveling, there occurs a condition that the surface of the main passage 5 is heated with heat generated by the engine, while intake air remains cooled. In such a transient condition, the thermal type flow sensor 26 exposed to the intake air is at a cold temperature, while the circuit board 4 is at an increased temperature. In the conventional case, there occurs no problem if the resistance temperature coefficients of the fixed resistances of the fixed temperature difference bridge mounted on the circuit board (corresponding to 4) are perfectly zero. However, if the resistance temperature coefficient has a variation of about 0±50 ppm as mentioned above, the bridge balance is lost and the sensor output (corresponding to 44) is varied.

Further, because the resistance values of the heat generating resistor 10 and the resistances of the fixed temperature difference bridge inevitably have manufacturing variations, the heating temperature of the heat generating resistor 10 undergoes a very large variation if no adjustment is performed. In the conventional thermal type flow measuring apparatus (corresponding to 1), therefore, the resistances of the fixed temperature difference bridge must be individually adjusted on the circuit board (corresponding to 4) by trimming using a laser, for example, and this necessity is another factor pushing up the cost.

Moreover, because the heating temperature of the heat generating resistor 10 is set to a level, e.g., about 100° C. to 200° C. higher than the ambient temperature, the actual temperature of the heat generating resistor 10 is about 200° C. to 300° C. at maximum when the temperature of intake air is 100° C.

During use for a long period of time, therefore, the heat generating resistor 10 gradually deteriorates and its resistance value changes correspondingly. Also, the temperature of the circuit board 4 is raised to about 125° C. substantially equal to the surface temperature of the main passage 5 because the circuit board 4 is subjected to not only a thermal effect similarly caused by the heating temperature of the heat generating resistor 10 mentioned above, but also a thermal effect caused by heat generating parts, such as a transistor, mounted on the surface of the circuit board 4. When the fixed resistances of the fixed temperature difference bridge are formed by printing, for example, as in the related art, the fixed resistances also gradually deteriorate and their resistance values change correspondingly. This leads to a problem that flow rate characteristics are changed with resistance changes.

In addition, although metallic materials, such as aluminum, were used as the main passage 5 in the past, resin materials have been recently used in many cases for weight reduction. On the other hand, there is a tendency toward a sharper demand for protection against electromagnetic interference, and an improvement in durability against electromagnetic interference is required.

A description is now made of superior points resulting from forming the resistances of the fixed temperature difference bridge as the temperature sensitive resistors on the same substrate as in the present invention.

First, the fact that the thermal type flow measuring apparatus according to the present invention, in which the fixed temperature difference bridge is entirely made up of the temperature sensitive resistors, properly operates is described below in comparison with the conventional one.

In the circuit diagram of FIG. 2, the fixed temperature difference bridge is constituted as a section made up of the heat generating resistor 10 and the temperature sensitive resistors 11, 12 and 13. Though not shown, a modification, in which the temperature sensitive resistors 12, 13 of the fixed temperature difference bridge are formed as fixed resistors, corresponds to the conventional fixed temperature difference bridge.

Assuming that, in the fixed temperature difference bridge shown in FIG. 2, the resistance value of the heat generating resistor 10 at 0° C. is Rh0, the resistance value of the temperature sensitive resistor 11 at 0° C. is Ra0, the resistance value of the temperature sensitive resistor 12 at 0° C. is Rb0, the resistance value of the temperature sensitive resistor 13 at 0° C. is Rc0, and all the resistance temperature coefficients (° C.$^{-1}$) of these resistors have the same value α, respective resistance values of these resistors at an arbitrary temperature T° C. can be expressed by the following formulae (1), (2), (3) and (4);

$$Rh = Rh0 \times (1 + \alpha \times T) \quad (1)$$

$$Ra = Ra0 \times (1 + \alpha \times T) \quad (2)$$

$$Rb = Rb0 \times (1 + \alpha \times T) \quad (3)$$

$$Rc = Rc0 \times (1 + \alpha \times T) \quad (4)$$

wherein Rh, Ra, Rb and Rc are respective resistance values of the resistors at an arbitrary temperature T° C.

Also, since Rh (i.e., the heat generating resistor 10) is controlled to be held at a level fixed temperature ΔT° C. higher than that of Ra, Rb and Rc (i.e., the temperature sensitive resistors 11, 12 and 13), the formula (1) can be rewritten to the following formula (5);

$$Rht = Rh0 \times (1 + \alpha \times (T + \Delta T)) \quad (5)$$

wherein Rht is a resistance value of the heat generating resistor 10 resulting when the fixed temperature difference bridge is actually operated.

On the other hand, the equilibrium condition of the fixed temperature difference bridge can be expressed by the following formula (6):

$$Rht \times Rc = Ra \times Rb \quad (6)$$

By putting the formulae (2), (3), (4) and (5) in the formula (6), the following formula (7) is obtained;

$$Rh0 \times (1 + \alpha \times (T + \Delta T)) \times Rc0 \times (1 + \alpha \times T) = Ra0 \times (1 + \alpha \times T) \times Rb0 \times (1 + \alpha \times T) \quad (7)$$

Assuming here the condition that Rb and Rc are at the same temperature, the formula (7) can be rewritten to the following formula (8):

$$Rh0 \times (1 + \alpha \times (T + \Delta T)) = Ra0 \times (1 + \alpha \times T) \times Rb0/Rc0 \quad (8)$$

This formula (8) is exactly the same as the equilibrium condition in the case in which Rb and Rc are given by the fixed resistances, and implies that the fixed temperature difference control can be performed.

In other words, the inventors have paid attention to the fact that, by forming the fixed temperature difference bridge so as to provide Rb and Rc to be held at the same temperature, all the resistances of the fixed temperature difference bridge can be formed as the temperature sensitive resistors.

According to the present invention, therefore, the fixed temperature difference bridge is of a structure in which the substrate 2 is made of, e.g., silicon having good thermal conductivity and the temperature sensitive resistors 12, 13 (Rb, Rc) are formed on such a substrate, or in which the temperature sensitive resistors 12, 13 (Rb, Rc) are arranged close to each other as shown in FIG. 1, in order that the temperature sensitive resistors 12, 13 (Rb, Rc) are held at the same temperature.

Alternatively, as seen from the formula (6), the above discussion is also likewise established when the ambient temperature is detected using Rb instead of Ra and the temperature sensitive resistors 11, 13 (Ra, Rc) are held at the same temperature.

By forming the fixed temperature difference bridge of the same material in the same manufacturing process, the following advantages are obtained.

A variation in absolute ones of the resistance values is, though depending on process conditions, about ±30%. However, when the resistors are formed by patterning in the same manufacturing process, there occurs no appreciable variation in a resistance ratio Rh/Rb of Rh to Rb and a resistance ratio Ra/Rc of Ra to Rc. Further, because all the resistances are formed on the same substrate, there also occurs no appreciable variation in their resistance temperature coefficients.

When the resistors are actually formed by patterning with the semiconductor process and the resistance ratio of the resistors is actually measured, the values of Rh/Rb and Ra/Rc are each not larger than ±0.07%. Also, it has been confirmed that a variation in absolute values of the resistance temperature coefficients is about ±1% among lots, whereas the variation can be made substantially zero for the same substrate 2 within the same lot.

Consequently, as shown in Table 1 (FIG. 23), the application of the present invention ensures that a variation in the heating temperature of the heat generating resistor 10 can be held at about ±1° C. without adjustments. This variation implies a great improvement as compared with the prior art in which a variation in the heating temperature is ±14° C., and represents a level that can be satisfactorily employed without adjustments.

With the application of the present invention, therefore, it is possible to omit a step of adjusting the heating temperature of the heat generating resistor 10, and hence to cut down the production cost. Further, since the fixed resistances of the fixed temperature difference bridge are not formed on the circuit board 4, the size of the circuit board 4 can be reduced.

Moreover, the structure resulting from the application of the present invention, in which all the temperature sensitive resistors are formed on the substrate 2 and are exposed to intake air, is advantageous from the thermal point of view because, as described above, the temperature of the surface of the main passage 5 and the circuit board 4 rises to about 125° C. at maximum, the temperature of intake air rises to a level as high as about 100° C. As a result, changes of Rb and Rc over time can be reduced.

In addition, even when Rb and Rc are changed over time, Rb and Rc exhibit similar changes because they undergo heat history under the same environmental conditions. Thus, the balance of the fixed temperature difference bridge is not changed, whereby the heating temperature difference ΔT of the heat generating resistor 10 can be prevented from changing. As a result, it is possible to prevent changes in the output 44 and to improve reliability.

Furthermore, with the application of the present invention, a variation in temperature characteristics is also reduced as seen from Table 1 (FIG. 23) and Table 2 (FIG. 24). As shown in FIG. 24, a variation in the resistance temperature coefficients of the temperature sensitive resistors is, e.g., 2000±20 ppm/° C. Also, a variation in the resistance temperature coefficients within the same substrate 2 is substantially zero, i.e., about ±2 ppm/° C. With the application of the present invention, the heating temperature of the heat generating resistor 10 is about 170° C.±2° C. when the ambient temperature is 20° C., and it is about 247° C.±2° C. when the ambient temperature is changed to 80° C. It is thus confirmed that a variation in the heating temperature of the heat generating resistor 10 is very small even with changes of the ambient temperature.

On the other hand, in the case of the prior art, the resistance temperature coefficients of the fixed resistances (corresponding to Rb and Rc) formed on the circuit board (corresponding to 4) by, e.g., printing are each basically 0 ppm/° C., but have a large variation of about ±50 ppm/° C. More specifically, in the case of the prior art, when the ambient temperature is 20°

C., the heating temperature of the heat generating resistor 10 is about 170° C.±3° C. and a variation in the heating temperature can be held relatively small. However, when the ambient temperature is changed to 80° C., the heating temperature of the heat generating resistor 10 is about 247° C.±8° C. and a variation in the heating temperature is increased. This increased variation increases a variation in temperature characteristics.

Figure 4:
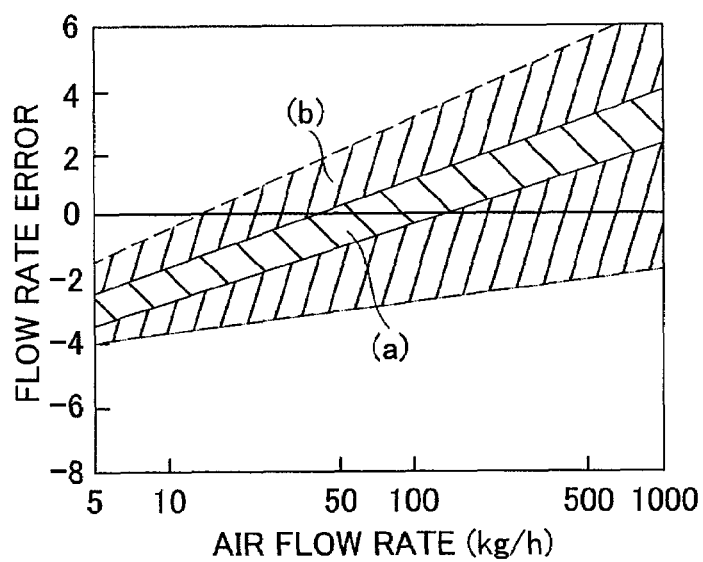
FIG. 4 is a graph for explaining a variation in temperature characteristics of the thermal type flow measuring apparatus according to the present invention.

FIG. 4 shows a comparison of a variation in temperature characteristics between the present invention and the prior art resulting when the ambient temperature is changed from 20° C. to 80° C. A region denoted by (a) in FIG. 4 represents a variation in temperature characteristics in the present invention, and a region denoted by (b) represents a variation in temperature characteristics in the prior art. As seen from FIG. 4, with the application of the present invention, a variation in temperature characteristics can be greatly reduced.

Further, with the structure of the present invention in which the fixed temperature difference bridge is entirely formed on the same substrate 2, a variation in the resistance temperature coefficients of Rb, Rc can be made very small and a temperature difference can be made less likely to occur between Rb and Rc (temperature sensitive resistors 11 and 12) by, for example, arranging them close to each other. Accordingly, a fluctuation of the output 44 can be prevented even in environmental conditions in which there occurs a temperature difference between the intake air and the substrate.

Moreover, since the fixed temperature difference bridge is entirely formed on the same substrate 2, lead lines for connection between the temperature sensitive resistors can be made very short, which is advantageous for protection against electromagnetic interference. This is because, in the prior-art structure in which the resistances of the fixed temperature difference bridge are formed on both the substrate (corresponding to 2) and the circuit board (corresponding to 4), long lead lines are required and serve as antennas receiving radio waves, whereas such a drawback is eliminated in the present invention.

As alternative means for obtaining similar advantages to those described above, it is conceivable, for example, to form Rh, Ra (i.e., the heat generating resistor 10 and the temperature sensitive resistor 11) on one substrate 2, to form Rb, Rc (i.e., the temperature sensitive resistors 12, 13) on another substrate 2, and to combine the two substrates with each other. This modification increases the number of steps required, but can provide substantially the same advantages as those described above, i.e., an omission of the step of adjusting the heating temperature and a smaller variation in temperature characteristics. Another advantage is from the thermal point of view in that Rb, Rc (i.e., the temperature sensitive resistors 12, 13) can be positioned away from heat generating resistor 10.

When aiming at an improvement of reliability as a main object, a satisfactory effect can be obtained just by forming all the resistances of the fixed temperature difference bridge as the temperature sensitive resistors of the same material. The reason resides in that, by using the same material, the temperature sensitive resistors change over time at a relatively matched tendency, and therefore the balance of the fixed temperature difference bridge is not changed.

The upstream-side temperature sensor 30 and the downstream-side temperature sensor 31 can be formed of any suitable one of various materials. As one example, those sensors may be formed of the same materials as that of the heat generating resistor 10 and the temperature sensitive resistors 11, 12 and 13. Using the same material is advantageous in simplifying the manufacturing process because all the resistors can be formed with only one sequence of resistance forming processes.

Another embodiment of the present invention will be described below with reference to FIGS. 6 and 7.

Figure 6:
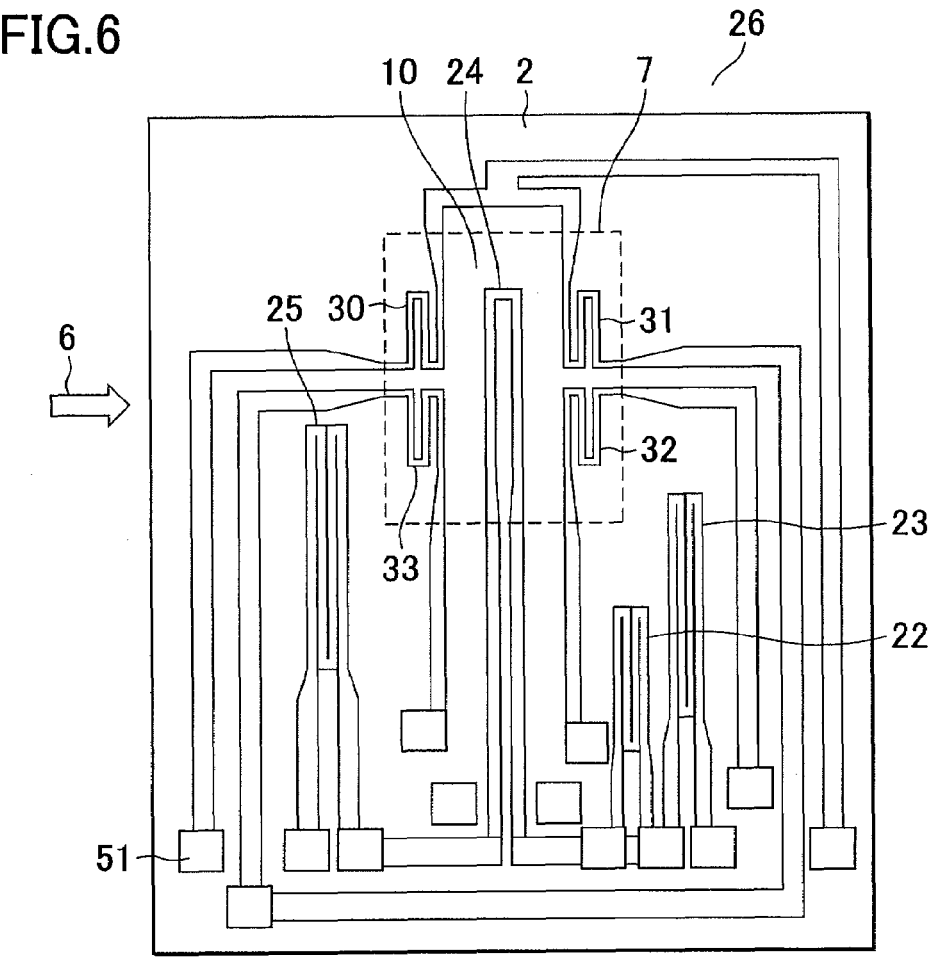
FIG. 6 is a wiring pattern diagram of a thermal type flow sensor according to another embodiment of the present invention.
Figure 7:
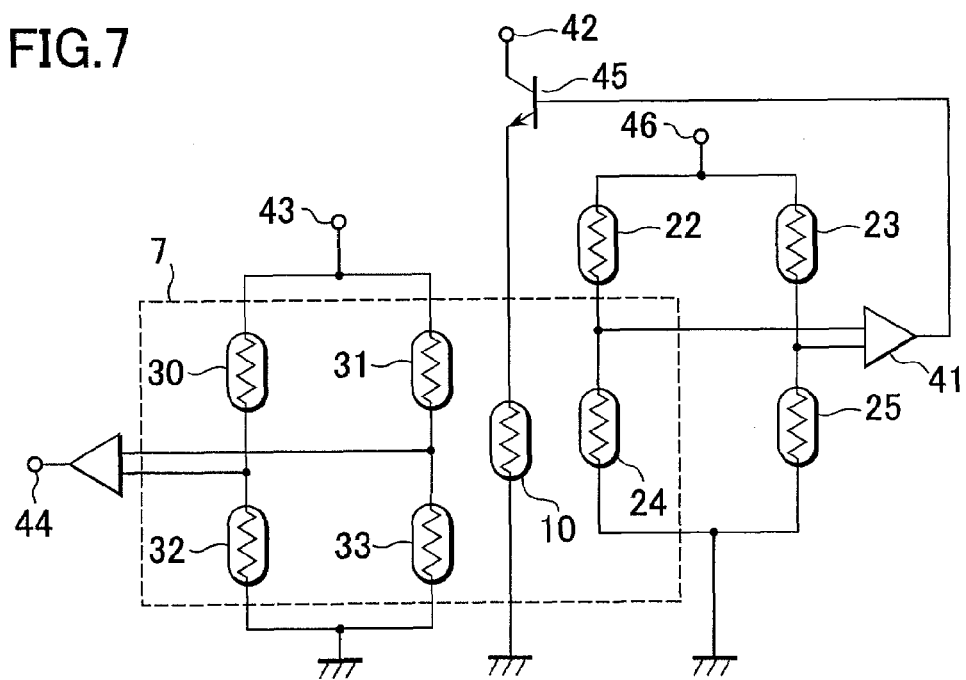
FIG. 7 is a circuit diagram including the thermal type flow sensor shown in FIG. 6.

FIG. 6 is a diagram showing a structure and a wiring pattern of a thermal type flow sensor 26 according to this embodiment, and FIG. 7 is a circuit diagram including the thermal type flow sensor 26 shown in FIG. 6. A method of manufacturing the thermal type flow sensor 26 is similar to that described above with reference to FIG. 1, and a description thereof is omitted here.

As shown in FIG. 6, a thin wall portion 7 is formed nearly in a central area of a substrate 2, and a temperature sensitive resistor 24 and a heat generating resistor 10 are arranged in the thin wall portion 7 close to each other. Upstream-side temperature sensors 30, 33 and downstream-side temperature sensors 31, 32 are formed respectively upstream and downstream of the heat generating resistor 10. The heat generating resistor 10 and four temperature sensitive resistors 22, 23, 24 and 25 are formed in the same manufacturing process using the same material. As a matter of course, it is more preferable for simplification of the manufacturing process that the upstream-side and downstream-side temperature sensors 30, 33, 31 and 32 be also formed in the same manufacturing process.

As shown in FIG. 7, the temperature sensitive resistor 24 is connected to the other temperature sensitive resistors 22, 23 and 25, all of which are formed on the same substrate 2, thereby forming a bridge. When the heat generating resistor 10 is cooled by a fluid flow, the temperature sensitive resistor 24 arranged close to the heat generating resistor 10 is also cooled, whereupon the bridge balance is changed. The heat generating resistor 10 is controlled to be substantially at a fixed temperature difference by controlling the change of the bridge balance in a feedback manner using a differential amplifier 41, a transistor 45, etc.

The present invention can also be applied to a fixed temperature difference control scheme employing the heat generating resistor 10 and the four temperature sensitive resistors 22, 23, 24 and 25, which are arranged as described above, and that type of the fixed temperature difference control scheme is also involved within the concept of the fixed temperature difference control circuit according to the present invention. Though not explained in detail, the concept of the present invention is further applicable to conventionally known other types of fixed temperature difference control circuits. In any case, at least four or more temperature sensitive resistors are required for the fixed temperature difference control.

Note that the advantages of this embodiment are the same as those described above, and hence a description thereof is omitted here.

Still another embodiment of the present invention will be described below with reference to FIGS. 8 and 9.

Figure 8:
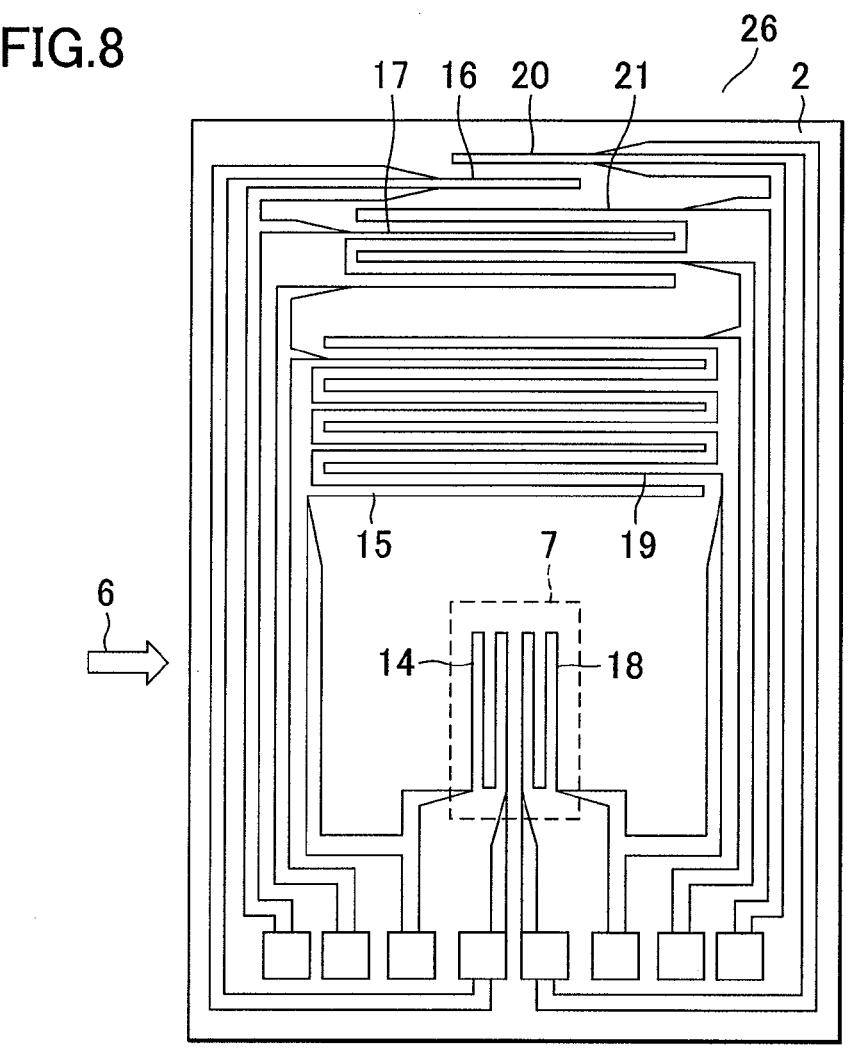
FIG. 8 is a wiring pattern diagram of a thermal type flow sensor according to still another embodiment of the present invention.
Figure 9:
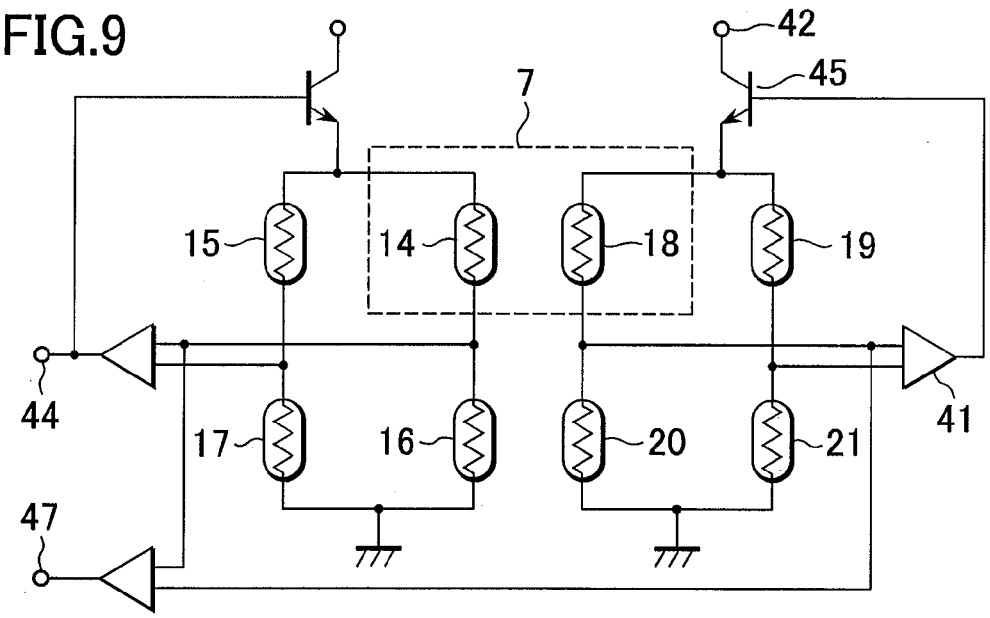
FIG. 9 is a circuit diagram including the thermal type flow sensor shown in FIG. 8.

FIG. 8 is a diagram showing a structure and a wiring pattern of a thermal type flow sensor 26 according to this embodiment, and FIG. 9 is a circuit diagram including the thermal type flow sensor 26 shown in FIG. 8. A method of manufacturing the thermal type flow sensor 26 is similar to that described above with reference to FIG. 1, and a description thereof is omitted here.

As shown in FIG. 8, a thin wall portion 7 is formed in a substrate 2, and two heat generating resistors 14, 18 are arranged in the thin wall portion 7 close to each other respectively on the upstream and downstream sides with respect to a fluid flow. Then, three temperature sensitive resistors 15, 16 and 17 are connected to the upstream-side heat generating resistor 14, and three temperature sensitive resistors 19, 20 and 21 are connected to the downstream-side heat generating resistor 18. These resistors are all formed as temperature sensitive resistors in the same manufacturing process using the same material. The heat generating resistors 14, 18 are operated while constituting respective fixed temperature difference bridges independent from each other as shown in FIG. 9. When there occurs a fluid flow 6, heat generated by the upstream-side heat generating resistor 14 is received by the downstream-side heat generating resistor 18 and therefore the amount of heat radiated from the downstream-side heat generating resistor 18 is reduced. When there occurs a fluid flow in a reversed direction, the amount of heat radiated from the upstream-side heat generating resistor 14 is reduced. By utilizing such a phenomenon, an output 47 representing the direction of the fluid flow and an output 44 representing the flow rate can be obtained.

The present invention is particularly effective when applied to a thermal type flow measuring apparatus 1 having the above-described structure.

More specifically, an error occurs unless a heating temperature difference ΔT between the two heat generating resistors 14 and 18 behaves essentially in the same way when the ambient temperature is changed or when the flow rate is changed. By forming all the resistances of the two fixed temperature difference bridges as the temperature sensitive resistors identical to each other as in the present invention, the heating temperature difference ΔT can be caused to always behave essentially in the same way because the resistance ratios and the resistance temperature coefficients of the two fixed temperature difference bridges are held substantially equal to each other. Also, by, as shown in FIG. 8, arranging the temperature sensitive resistors 15, 19 of the two fixed temperature difference bridges close to each other to have the same temperature as far as possible and likewise arranging the temperature sensitive resistors 16, 17, 20 and 21 close to each other to have the same temperature as far as possible, the heating temperature difference ΔT between the two temperature sensitive resistors 14 and 18 is caused to behave more exactly in the same manner. Consequently, the measurement can be performed with higher accuracy. Other advantages of this embodiment are the same as those described above, and hence a description thereof is omitted here.

Still another embodiment of the present invention will be described below with reference to FIG. 10.

Figure 10:
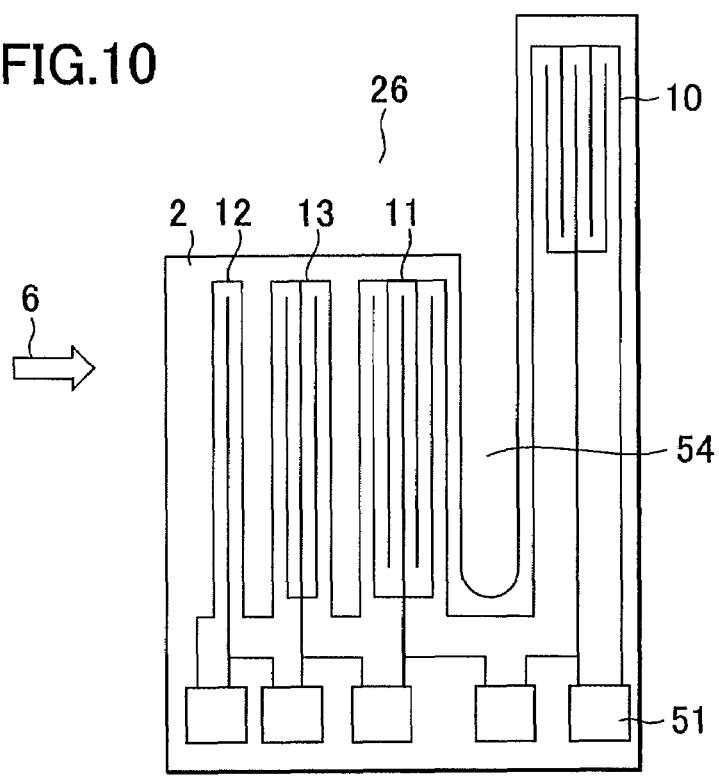
FIG. 10 is a wiring pattern diagram of a thermal type flow sensor according to still another embodiment of the present invention.

FIG. 10 is a diagram showing a structure and a wiring pattern of a thermal type flow sensor 26 according to this embodiment. A ceramic substrate made of alumina and having a thickness of about 0.1 mm is used as a substrate 2. On one surface of the substrate 2, after forming a thin film of platinum, for example, by sputtering, a heat generating resistor 10 and temperature sensitive resistors 11, 12 and 13 are formed on the thin film by patterning.

The heat generating resistor 10 and the temperature sensitive resistors 11, 12 and 13 are connected so as to form a fixed temperature difference bridge. Then, as shown in FIG. 10, a slit 54 is formed between the heat generating resistor 10 and the temperature sensitive resistors 11, 12 and 13 to prevent thermal conduction from the heat generating resistor 10 to the temperature sensitive resistors 11, 12 and 13. The present invention can also be applied to the thermal type flow sensor 26 thus constructed. Note that advantages of this embodiment are the same as those described above, and hence a description thereof is omitted here.

Still another embodiment of the present invention will be described below with reference to FIG. 11.

Figure 11:
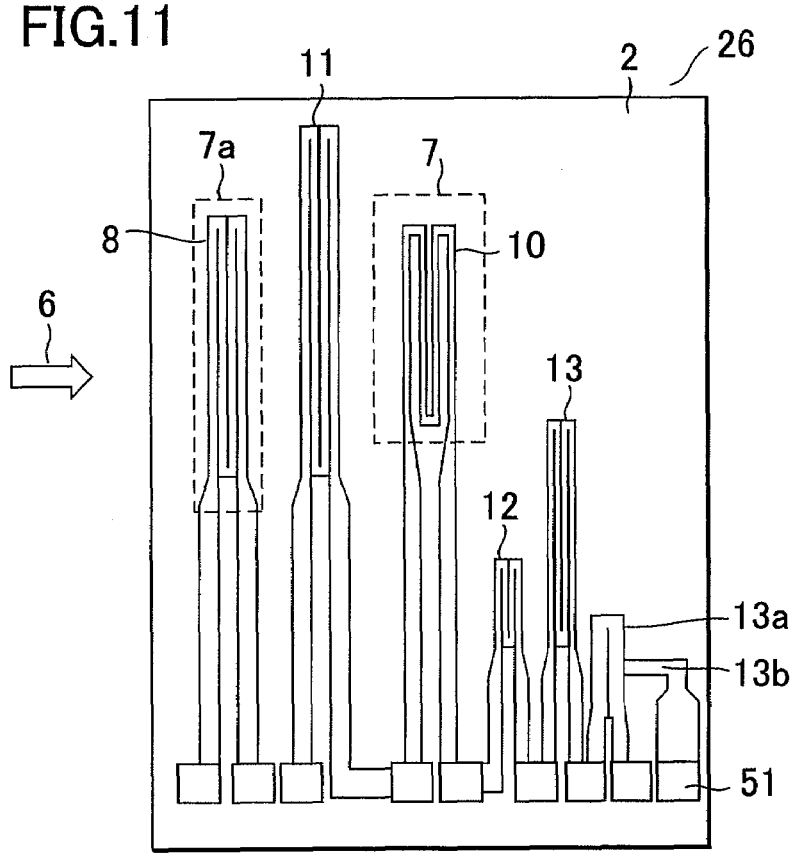
FIG. 11 is a wiring pattern diagram of a thermal type flow sensor according to still another embodiment of the present invention.

As shown in FIG. 11, a thin wall portion 7 is formed in a substrate 2, and the thin wall portion 7 is thermally insulated from the substrate 2. A heat generating resistor 10 is formed in the thin wall portion 7, and temperature sensitive resistors 11, 12, 13, 13a and 13b are formed and electrically connected to the heat generating resistor 10. Resistance values of the temperature sensitive resistors 13a, 13b are each set not more than 10% of that of the temperature sensitive resistor 13. On an assumption that the resistance value of the heat generating resistor 10 under operation is Rht, the resistance value of the temperature sensitive resistor 11 under operation is Ra, the resistance value of the temperature sensitive resistor 12 under operation is Rb, the resistance value of the temperature sensitive resistor 13 under operation is Rc, the resistance value of the temperature sensitive resistor 13a under operation is Rca, the resistance value of the temperature sensitive resistor 13b under operation is Rcb, and all the resistance temperature coefficients of these resistors have the same value α, formation of a bridge expressed by the following formula (9), for example, can be assumed:

$$Rht \times Rc = Ra \times Rb \qquad (9)$$

The heating temperature of the heat generating resistor 10 inevitably has a variation of about ±1° C. to ±2° C. as shown in FIGS. 23 and 24, and such a variation cannot be perfectly eliminated. In order to perform the flow measurement with higher accuracy, it is therefore more preferable to change the bridge balance, as represented in the following formulae (10), (11) and (12), using Rca and Rcb (temperature sensitive resistors 13a and 13b) both connected to Rc (temperature sensitive resistor 13);

$$Rht \times (Rc + Rca) = Ra \times Rb \qquad (10)$$

$$Rht \times (Rc + Rcb) = Ra \times Rb \qquad (11)$$

$$Rht \times (Rc + Rca + Rcb) = Ra \times Rb \qquad (12)$$

Combinations of the resistances represented by the formulae (9), (10), (11) and (12) can be realized by modifying connections between electrodes 51, and these modifications can be inexpensively achieved because of no need of adjustment, such as trimming, using a laser, for example, from the viewpoint of manufacturing process. Such a change of the bridge balance is effective particularly in absorbing a variation in the heating temperature caused by a variation in the resistance temperature coefficients.

Since the resistance temperature coefficients do not undergo a large variation within the same lot, it is just required to modify connections between the electrodes 51. Thus, this embodiment basically requires no adjustment. The temperature sensitive resistors, such as represented by Rca and Rcb shown in FIG. 11, for finely adjusting the heating temperature may be formed as serial resistances or parallel resistances. When there is a space left on the substrate 2, higher accuracy can be achieved by increasing the number of the temperature sensitive resistors formed on the substrate.

Additionally, as understood from the formula (9), fine adjustment of the heating temperature can be realized regardless of the temperature sensitive resistors for fine adjustment, described above, being combined with which one of the bridge resistances constituting the fixed temperature difference bridge.

Other embodiments of the present invention will be described below.

The temperature characteristics shown in FIG. 4 have such flow rate dependency that there occurs a minus error at a low flow rate and a plus error at a high flow rate. When the fixed temperature difference bridge is entirely made up of the temperature sensitive resistors, a variation in temperature characteristics can be reduced, but it is difficult to eliminate such flow rate dependency.

Figure 12:
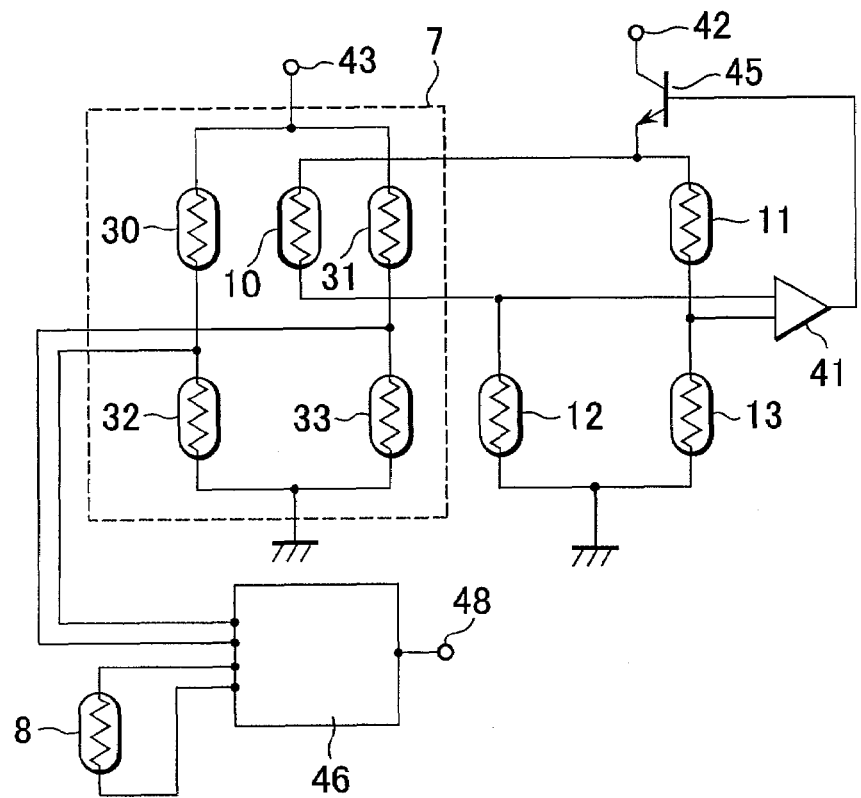
FIG. 12 is a circuit diagram including the thermal type flow sensor shown in FIG. 11.

To reduce the error caused by the flow rate dependency, as shown in FIG. 11, a temperature sensor 8 is formed on the substrate 2 so that an output representing the temperature detected by the temperature sensor 8 is obtained in addition to a flow rate output from a thermal type flow sensor 26. Then, as shown in FIG. 12, the flow rate output from the thermal type flow sensor 26 and the temperature sensor output are inputted to a compensation circuit 46. Errors of the temperature characteristics can be further reduced by delivering the flow rate output after compensating for the flow rate dependency in the compensation circuit 46.

The temperature sensor 8 is particularly preferably formed of the same material as that used for the fixed temperature difference bridge. By forming the temperature sensor 8 in the same manufacturing process using the same material, the temperature sensor 8 is able to have the same resistance temperature coefficient as that of each component of the fixed temperature difference bridge and the flow rate dependency can be relatively easily compensated.

Although the heat generating resistor 10 is formed in the thin wall portion 7 and is thermally insulated from the substrate 2, a slight amount of heat is conducted to the substrate 2, and the temperature sensitive resistors, including 11, 12 and 13, also generates a slight amount of heat. Accordingly, the temperature of the substrate 2 rises if the substrate 2 has a relatively small area or has poor heat radiation. In that case, the temperature of the temperature sensor 8 also rises, thus resulting in a possibility that there occurs an error in compensation of the flow rate dependency. Taking into account such an error, more effective compensation can be achieved by arranging the temperature sensor 8 in a second thin wall portion 7a to be thermally insulated from the substrate 2 as shown in FIG. 11.

As an alternative, the temperature sensor 8 may be incorporated in the compensation circuit 46 although the error is slightly increased. In this case, the necessity of wiring for connection between the temperature sensor 8 and the compensation circuit 46 is eliminated.

The temperature sensor 8 can also be used, as it is, to detect the temperature of intake air, which is used for engine control. In particular, the structure wherein the temperature sensor 8 is arranged in the second thin wall portion 7a is more preferable because that structure provides a faster response.

One application example of the present invention will be described below with reference to FIG. 13.

Figure 13:
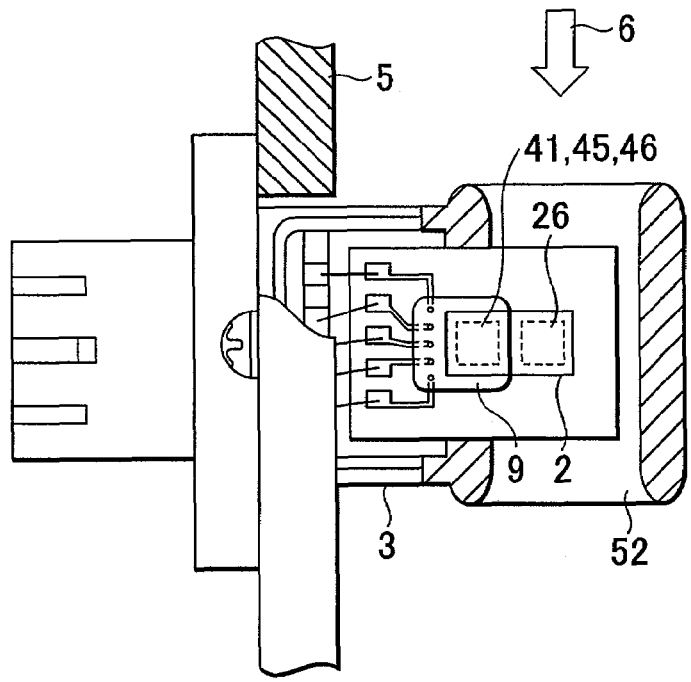
FIG. 13 is a sectional view showing a thermal type flow measuring apparatus having the thermal type flow sensor shown according to the present invention.

By forming all the resistances of the fixed temperature difference bridge as the temperature sensitive resistors, as shown in FIG. 13, not only the thermal type flow sensor 26, but also the differential amplifier 41, the transistor 45, the compensation circuit 46, etc. can be all formed on one substrate 2 made of the same semiconductor.

Even in attempting to realize an integral structure in the prior art, another circuit board (corresponding to 4) separate from the substrate is essential because of the presence of the fixed resistances for the fixed temperature difference bridge and the necessity of adjustment of the heating temperature. By employing the structure of the present invention in which all the resistances of the fixed temperature difference bridge are formed as the identical temperature sensitive resistors, the circuit board 4 is not necessarily required in the present invention. As a result, the size and the production cost of a flow measuring apparatus can be further cut down.

A maximum advantageous obtained with the integration of the thermal type flow sensor 26 and the circuit board 4 resides in that, when a section of the thermal type flow sensor 26 is cooled by intake air, the differential amplifier 41, the transistor 45, the compensation circuit 46, etc., which are formed on the same substrate 2, are also simultaneously cooled, whereby the latter components always have the temperature as that of the thermal type flow sensor 26.

In the prior art, when a temperature difference occurs between the temperature of intake air and the circuit board (corresponding to 4) and the temperature of the circuit board is not uniform, temperature characteristics of electronic parts mounted on the circuit board fluctuate in a complicated way, thus resulting in an error of the sensor output (corresponding to 44). Such an error can be greatly reduced with the application of the present invention. The sub-passage 52 may have a bent portion. The use of a bent-shaped sub-passage is effective in protecting the thermal type flow sensor 26, including many resistances and circuits formed therein, against dust, liquid droplets and backfire which are contained in the fluid flow.

Still another embodiment of the present invention will be described below with reference to FIGS. 14, 15, 16 and 5.

Figure 5:
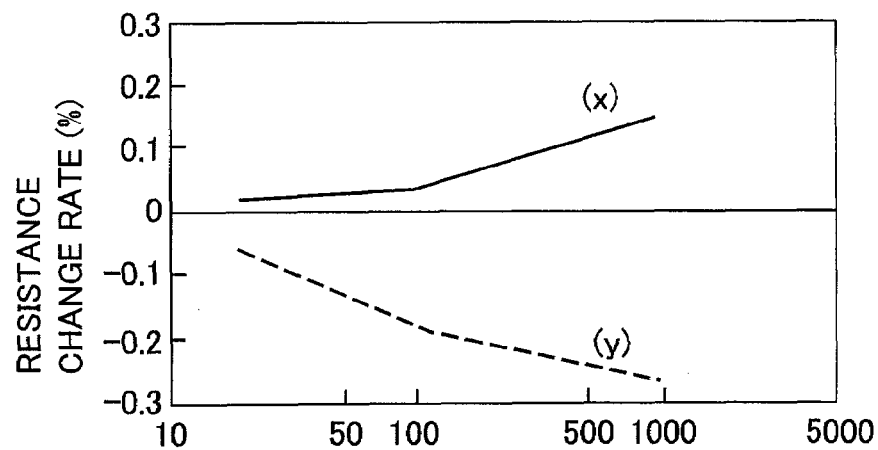
FIG. 5 is a graph for explaining one example of resistance changes of a heat generating resistor over time.
Figure 14:
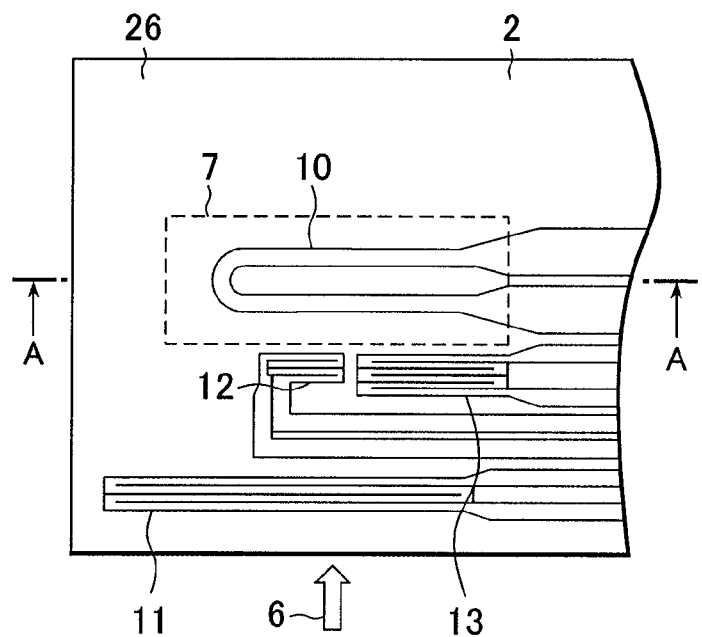
FIG. 14 is a partial enlarged view of a thermal type flow sensor according to still another embodiment of the present invention.
Figure 15:
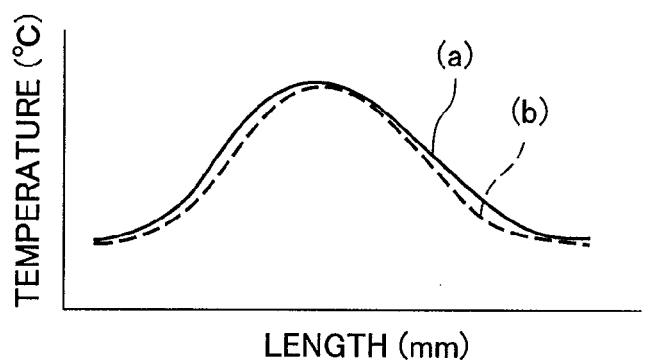
FIG. 15 is a graph of a temperature distribution of a heat generating resistor for explaining an advantage of the thermal type flow sensor according to the present invention shown in FIG. 14.
Figure 16:
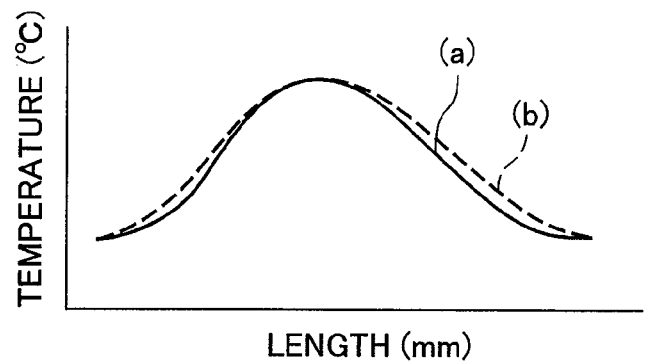
FIG. 16 is a graph of a temperature distribution of a heat generating resistor for explaining an advantage of the thermal type flow sensor according to the present invention shown in FIG. 14.

FIG. 14 is a partial enlarged view of a thermal type flow sensor 26 according to this embodiment, and FIGS. 15 and 16 are each a graph showing an example of a temperature distribution measured along a section A-A in FIG. 14. FIG. 5 is a graph showing one example of resistance changes of a heat generating resistor 10 when it is energized and heated to about 250° C.

As shown in FIG. 14, the thermal type flow sensor 26 comprises a heat generating resistor 10 and the temperature sensitive resistors 11, 12 and 13. Assuming here that the resistance value of the heat generating resistor 10 under operation is Rht, the resistance value of the temperature sensitive resistor 11 under operation is Ra, the resistance value of the temperature sensitive resistor 12 under operation is Rb, the resistance value of the temperature sensitive resistor 13 under operation is Rc, and all the resistance temperature coefficients of these resistors have the same value α, a fixed temperature difference bridge expressed by the following formula (13), for example, can be formed:

$$Rht \times Rc = Ra \times Rb \quad (13)$$

The resistance value of the heat generating resistor 10 always used in a heated state gradually changes as shown in FIG. 5. In FIG. 5, (X) represents resistance changes of a polysilicon thin-film resistor over time, and (Y) represents resistance changes of a platinum thin-film resistor over time. Thus, a tendency of resistance changes over time differs depending on materials used for the heat generating resistor 10.

A description is first made of, with reference to FIG. 15, changes of a temperature distribution when the resistance value gradually increases like a polysilicon thin-film resistor. Because the bridge balance represented by the formula (13) is not changed even with an increase of the resistance value of the heat generating resistor 10, i.e., Rht, which is resulted from deterioration over time, the heating temperature of the heat generating resistor 10 lowers in an amount corresponding to the resistance increase of Rht.

FIG. 15 shows an actually measured example of such a lowering of the heating temperature. In FIG. 15, a curve (a) represents the temperature distribution before the resistance change, and a curve (b) represents the temperature distribution after the resistance change. Comparing the curves (a) and (b), it is understood that the changes of the temperature distribution are not even and the change amount is smaller in a portion at a higher temperature.

The reason resides in that the portion at a higher temperature undergoes a more significant change over time and exhibits a larger resistance increase, while it generates Joule heat in amount increased corresponding to the resistance increase as compared with the other portion.

By positively utilizing the changes of the temperature distribution, it is possible to prevent a reduction of the heating temperature of the heat generating resistor 10 caused by resistance changes thereof over time. More specifically, as shown in FIG. 14, Rb (temperature sensitive resistor 12) is formed in the vicinity of an area in which the temperature of the heat generating resistor 10 has a maximally high value, and Rc (temperature sensitive resistor 13) is formed in the vicinity of an area in which the temperature of the heat generating resistor 10 has a relatively low value.

Although the heat generating resistor 10 is formed in the thin wall portion 7 and is thermally insulated from the substrate 2, a slight amount of heat is still conducted to the substrate 2. With the above-mentioned pattern layout, therefore, Rb and Rc are subjected to a slight temperature difference between them.

When the temperature distribution is changed from one represented by (a) in FIG. 15 to another represented by (b) in FIG. 15 as a result of the time-dependent change, the temperature in the Rb area is hardly changed, while the temperature in the Rc area slightly lowers. Accordingly, the resistance value Rc of the temperature sensitive resistor 13 is reduced and the bridge balance is changed, whereby a lowering of the heating temperature can be prevented. As an alternative, it is also possible to more positively utilize the changes of the temperature distribution by arranging parts of the Rc and Rb patterns in the thin wall portion 7.

As a result of preventing changes of the heating temperature of the heat generating resistor 10 in such a manner, characteristic changes of the output 44 can also be prevented.

The concept of this embodiment is of course applicable to the thermal type flow sensors, shown in FIGS. 1, 6 and 8, according to the other embodiments of the present invention, and the same advantage is obtained.

A description is now made of, with reference to FIG. 16, changes of a temperature distribution when the resistance value gradually decreases like a platinum thin-film resistor. When the resistance value of the heat generating resistor 10 is reduced over time, the heating temperature of the heat generating resistor 10 rises contrary to the above-described case of using a polysilicon thin-film resistor. FIG. 16 shows an actually example of such a rise of the heating temperature. In FIG. 16, a curve (a) represents the temperature distribution before the resistance change, and a curve (c) represents the temperature distribution after the resistance change. Comparing the curves (a) and (c), it is understood that the changes of the temperature distribution are not even and the change amount is smaller in a portion at a higher temperature. The reason resides in that the portion at a higher temperature undergoes a more significant change over time and exhibits a larger resistance decrease, while it generates Joule heat reduced in amount corresponding to the resistance decrease as compared with the other portion.

The pattern arrangement of the temperature sensitive resistors in this case is also exactly the same as that in the above-described case. More specifically, as shown in FIG. 14, Rb (temperature sensitive resistor 12) is formed in the vicinity of an area in which the temperature of the heat generating resistor 10 has a maximally high value, and Rc (temperature sensitive resistor 13) is formed in the vicinity of an area in which the temperature of the heat generating resistor 10 has a relatively low value. When the temperature distribution is changed as a result of the time-dependent change, the temperature in the Rb area is hardly changed, while the temperature in the Rc area slightly rises. Accordingly, the resistance value Rc of the temperature sensitive resistor 13 is increased, whereby a rise of the heating temperature can be prevented.

Still another embodiment of the present invention will be described below with reference to FIGS. 17 and 18.

Figure 17:
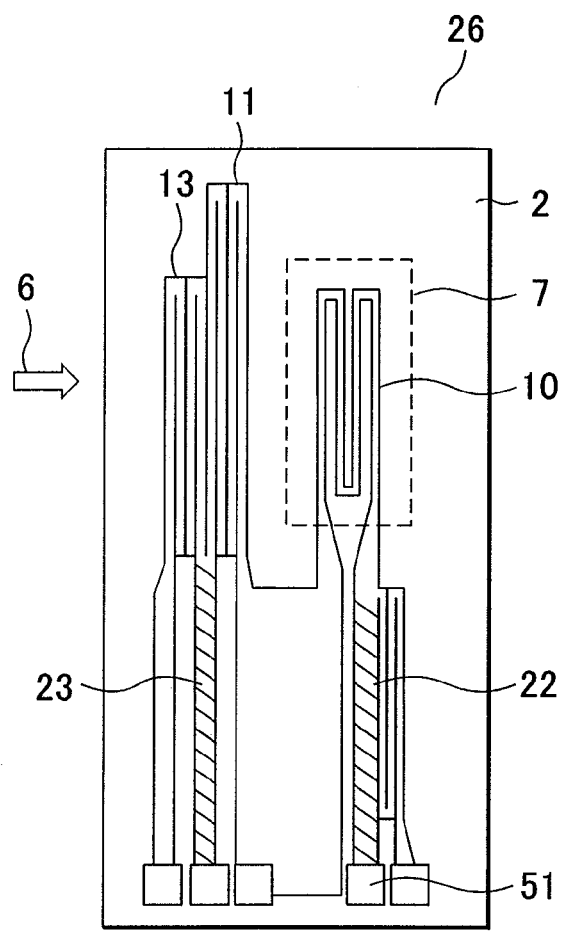
FIG. 17 is a wiring pattern diagram of a thermal type flow sensor according to still another embodiment of the present invention.
Figure 18:
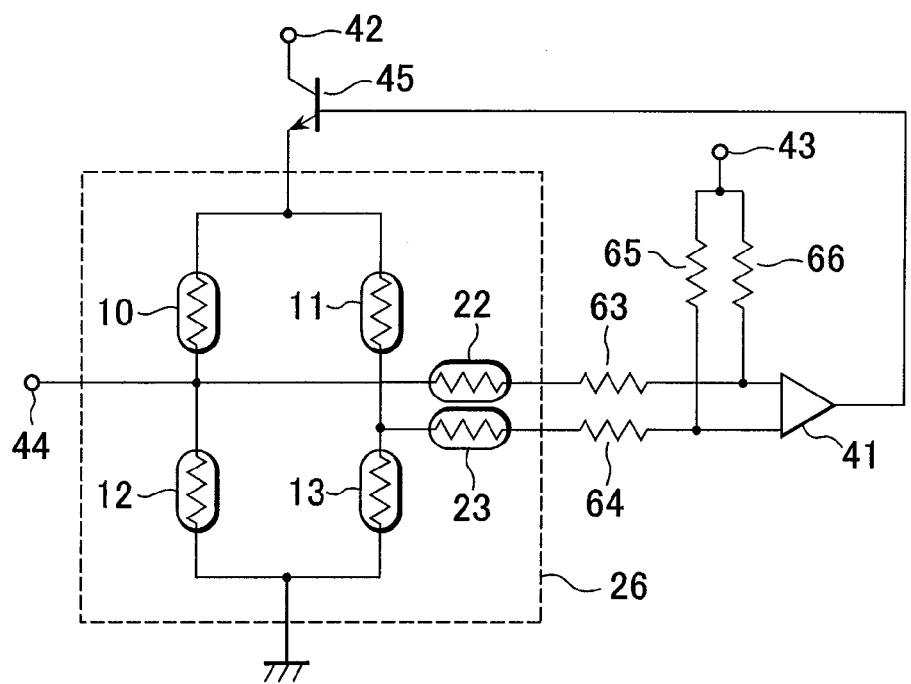
FIG. 18 is a circuit diagram including the thermal type flow sensor shown in FIG. 17.

FIG. 17 is a diagram showing a structure and a wiring pattern of a thermal type flow sensor 26 according to this embodiment, and FIG. 18 is a circuit diagram including the thermal type flow sensor 26 shown in FIG. 17.

By connecting a temperature sensitive resistor 22 to an intermediate portion of a lead line extended from a heat generating resistor 10, as shown in FIG. 17, useless resistance between the heat generating resistor 10 and its electrode 51 can be reduced. The smaller wiring resistance, the smaller a voltage of a power supply 42 is required to heat the heat generating resistor 10. In particular, a 12-V battery is employed in automobiles, and a voltage of the battery is dropped to about 6 V especially upon startup of an engine. For that reason, it is preferable that the thermal type flow measuring apparatus 1 operates at a lower driving voltage.

Stated otherwise, in the structure of this embodiment, a led-out temperature sensitive resistor 22 is formed midway one lead line connected to one input terminal of a differential amplifier 41. When the resistance value of the led-out temperature sensitive resistor 22 changes depending on temperatures, the input voltage of the differential amplifier 41 is changed and then appears as changes of the heating temperature of the heat generating resistor 10.

Corresponding to that structure, in the present invention, another temperature sensitive resistor 23 having a resistance value almost equal to that of the led-out temperature sensitive resistor 22 is formed in the same manufacturing process midway the other lead line connected to the other input terminal of the differential amplifier 41.

FIG. 18 shows a circuit diagram including the thermal type flow sensor 26 of this embodiment. In the circuit configuration of this embodiment, the led-out temperature sensitive resistors 22, 23 are formed in the respective lead lines connected from the fixed temperature difference bridge to the input terminals of the differential amplifier 41. By forming the led-out temperature sensitive resistors 22, 23 to have the same resistance value and the same resistance temperature coefficient, however, the heating temperature is not changed. Consequently, with application of the present invention in the form of this embodiment, the power supply voltage can be reduced without causing a variation in temperature characteristics.

A still another embodiment of the present invention will be described below.

First, a supplementary description is made of the heating temperature of the heat generating resistor 10 with reference to FIGS. 23 (Table 1) and 24 (Table 2). As shown in Table 2, the heating temperature of the heat generating resistor 10 is 170° C. when the ambient temperature is 20° C., and the temperature difference $\Delta T$ between the heating temperature and the ambient temperature is 150° C. Likewise, when the ambient temperature is 80° C., the temperature difference $\Delta T$ is 167° C. (=247° C.−80° C.).

In other words, the fixed temperature difference bridge has a tendency that, as the ambient temperature rises, $\Delta T$ slightly increases. When the heat generating resistor 10 takes a higher temperature at the ambient temperature which is relatively high, this implies that the heat generating resistor 10 has a smaller allowance for changes over time.

Figure 22:
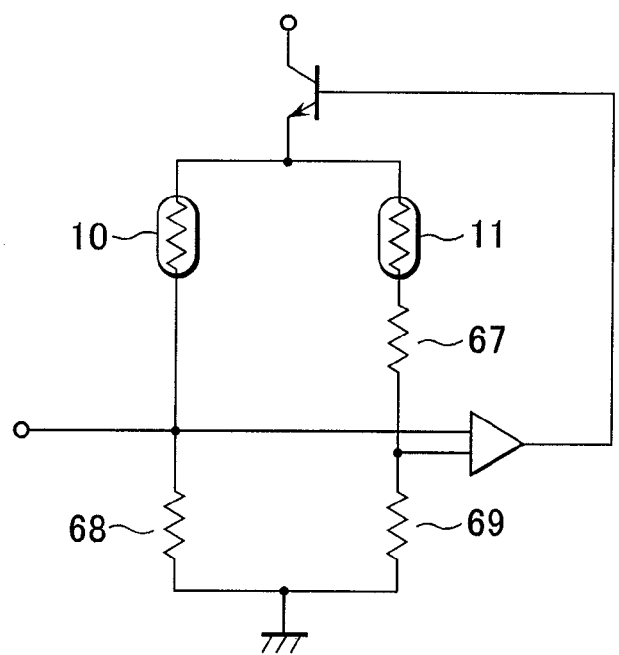
FIG. 22 is a circuit diagram including a thermal type flow sensor of the prior art.

Some of related art is designed to be able to change ΔT of the heat generating resistor 10 as desired depending on changes of the ambient temperature. In one known example, as shown in a circuit diagram of FIG. 22, a fixed resistance 67 is connected in series to one temperature sensitive resistor (corresponding to 11) of the fixed temperature difference bridge.

In view of the above, still another embodiment of the present invention is intended to provide means for obtaining a similar advantage by using the temperature sensitive resistors.

Such an embodiment of the present invention will be described below with reference to FIGS. 19 and 20.

Figure 19:
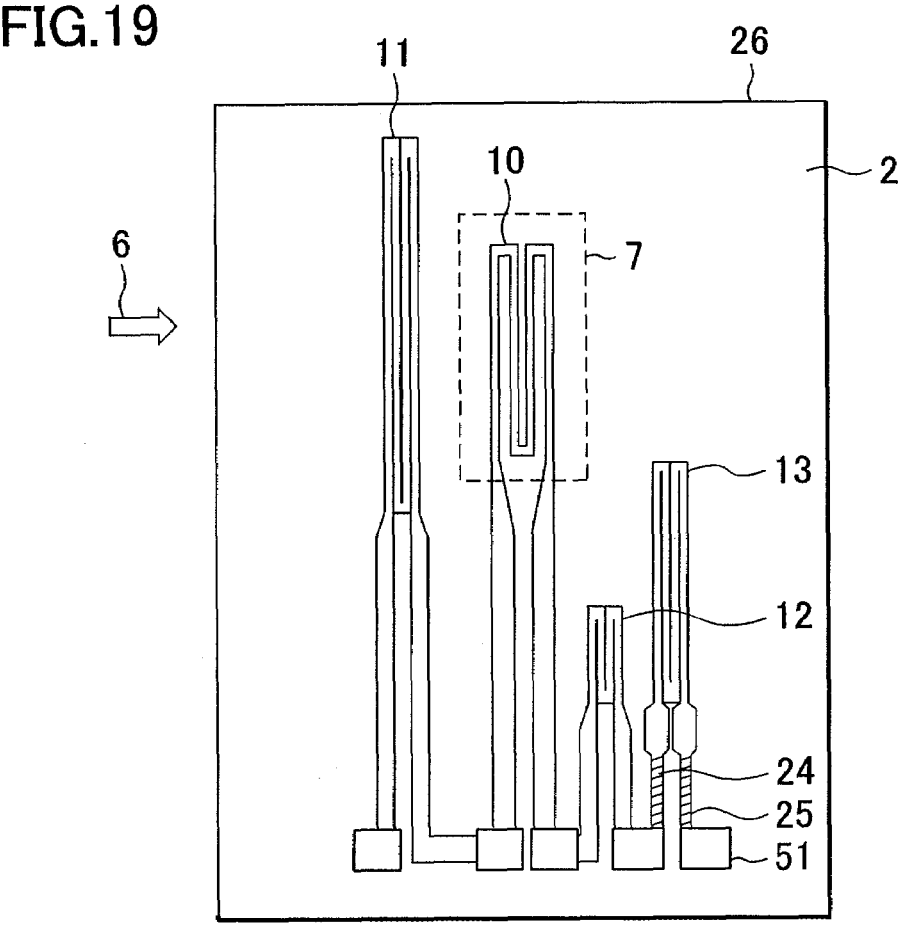
FIG. 19 is a wiring pattern diagram of a thermal type flow sensor according to still another embodiment of the present invention.

FIG. 19 shows a structure of a thermal type flow sensor 26 comprising a heat generating resistor 10 and temperature sensitive resistors 11, 12 and 13, which are formed in the same manufacturing process using the same material. When a polysilicon thin-film resistor is employed as the material, the resistance temperature coefficient is about 2000 ppm/° C. Then, second temperature sensitive resistors 24, 25 are formed of, e.g., a platinum thin-film resistor having a different resistance temperature coefficient and are electrically connected to the temperature sensitive resistor 13. The resistance temperature coefficient of the platinum thin-film resistor is about 3000 ppm/° C.

Figure 20:
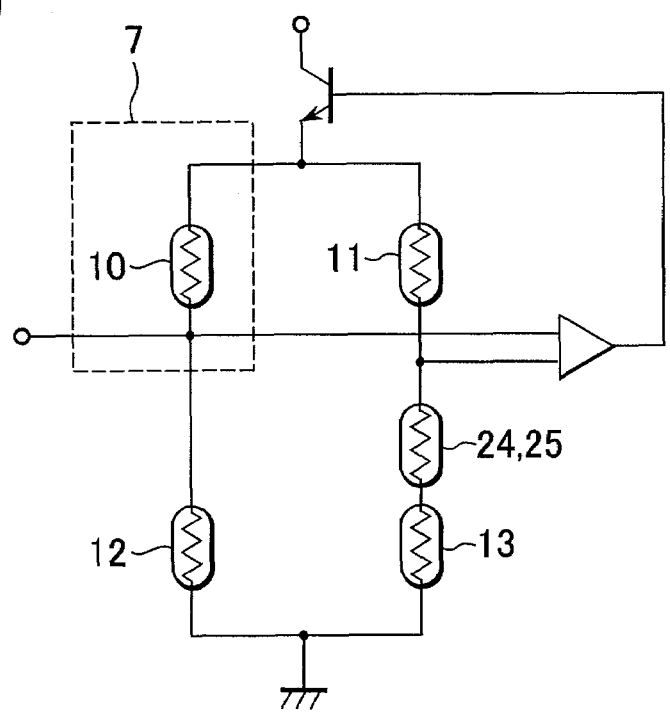
FIG. 20 is a circuit diagram including the thermal type flow sensor.

FIG. 20 is a circuit diagram including the thermal type flow sensor 26 of this embodiment. With the above-mentioned structure shown in FIG. 20, a portion including a combination of the temperature sensitive resistor 13 and the second temperature sensitive resistors 24, 25 exhibits larger resistance changes with respect to changes of the ambient temperature than the other temperature sensitive resistor 12.

By properly setting the resistance values of the second temperature sensitive resistors 24, 25, therefore, ΔT of the heat generating resistor 10 can be reduced as desired at a higher ambient temperature.

It is also possible to form electrodes 51 and the second temperature sensitive resistors 24, 25 of the same material. In such a case, this embodiment can be implemented with no need of a new additional step of forming the second temperature sensitive resistors 24, 25. A platinum thin film, an aluminum thin film or the like having a relatively high resistance temperature coefficient is suitable as the material for the electrodes 51 and the second temperature sensitive resistors 24, 25.

As an alternative case, the heat generating resistor 10 and the temperature sensitive resistors 11, 12 and 13 may have a higher resistance temperature coefficient than that of the second temperature sensitive resistors 24, 25. In this case, a similar advantage can be obtained by combining the second temperature sensitive resistors 24, 25 with the temperature sensitive resistor 11 or 12.

Further, as described above with reference to FIG. 5, a semiconductor material, such as a polysilicon thin film, and a metallic material, such as a platinum thin film, show opposite tendencies in resistance change over time. With application of the present invention in the form of this embodiment, therefore, changes of the heating temperature of the heat generating resistor can be reduced by utilizing the fact that the resistance value of the heat generating resistor is increased, for example, because of deterioration over time, while the resistance values of the second temperature sensitive resistors are reduced. As a result, this embodiment provides an advantage that a thermal type flow measuring apparatus 1 having higher reliability can be provided.

Figure 21:
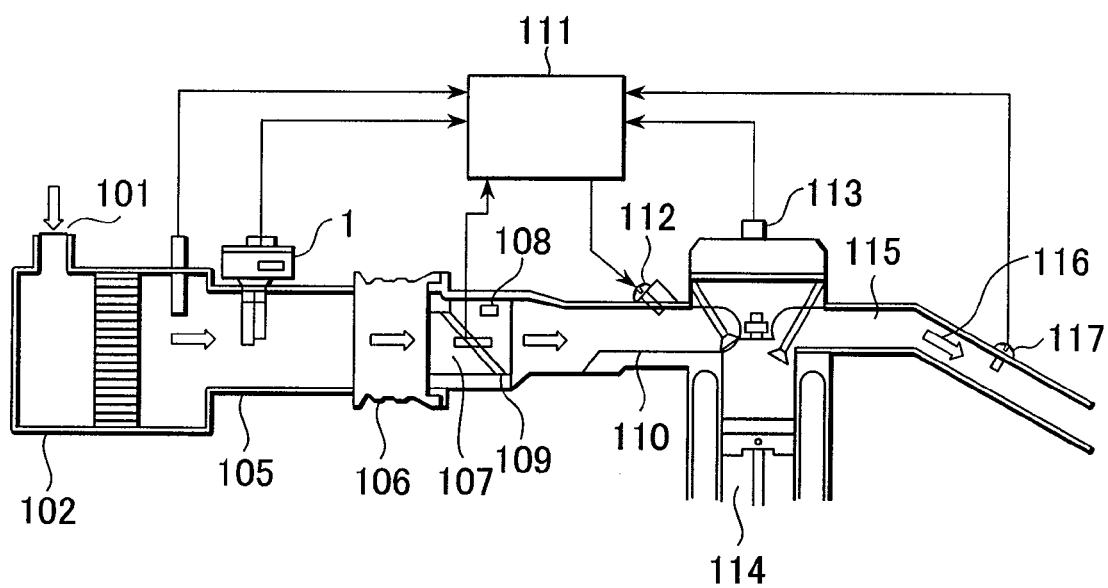
FIG. 21 is a system diagram of an internal combustion engine to which the present invention is applied.

FIG. 21 shows an embodiment in which the present invention is applied to an internal combustion engine, in particular, a gasoline engine. In this embodiment, the flow rate of intake air 101 supplied to the engine is detected by the thermal type flow measuring apparatus 1 according to the present invention while the intake air flows through an intake passage, which is formed in an integral structure of an air cleaner 102, a body 105, a duct 106, a throttle angle sensor 107, an idling air control valve 108 and a throttle body 109 with an intake manifold 110, or through a bypass. The detected signal is taken into a control unit 111 in the form of voltage, frequency, etc. and is employed for control of a structure and subsystem of a combustion section constituted by an injector 112, a tachometer 113, an engine cylinder 114, an exhaust manifold 115, a gas 116, and an oxygen concentration meter 117.

The present invention is also applicable to a diesel engine because it has substantially the same basic structure as that of a gasoline engine. More specifically, the thermal type flow measuring apparatus 1 of the present invention is disposed between an air cleaner (corresponding to 102) and an intake manifold (corresponding to 115) of the diesel engine to detect the flow rate of intake air, and the detected signal is taken into a control unit (corresponding to 111).

Recently, to be adapted for social demands such as more strict restriction of automobile exhaust gas and protection against air pollution, studies have been intensively made on, for example, propane gas vehicles, natural gas vehicles, or vehicles in which a fuel cell using hydrogen and oxygen, as fuel, to generate electric power and the vehicle is moved with a motor driven by the generated electric power.

The thermal type flow measuring apparatus of the present invention can be likewise applied to a system for detecting the flow rate of a fluid and properly controlling the amount of supplied fuel in each of those vehicles.

According to the embodiments described above, the flow rate of a fluid can be detected with high accuracy even in a thermally severe environment such as represented by an engine room, and a thermal type flow measuring apparatus having high reliability can be provided a relatively inexpensive cost.

What is claimed is:

1. A thermal type flow measuring apparatus comprising:
    a fixed temperature difference bridge circuit for controlling current flowing through a heat generating resistor at which the heating of the heat generating resistor is controlled so as to have a fixed temperature difference relative to the ambient temperature;
    wherein a flow rate of a fluid is detected by using a resistor which is arranged near the heat generating resistor;
    wherein the bridge circuit consists of a first serially connected circuit in which a first temperature sensitive resistor and a second temperature sensitive resistor are connected in series and a second serially connected circuit in which a third temperature sensitive resistor and a fourth temperature sensitive resistor are connected in series, and the first serially connected circuit and the second serially connected circuit are connected in parallel by connecting one end of the first temperature sensitive resistor and one end of the third temperature sensitive resistor, and connecting one end of the second temperature sensitive resistor and one end of the fourth temperature sensitive resistor;
    wherein the first, second, third and fourth temperature sensitive resistors are formed on a semiconductor base plate, and the first temperature sensitive resistor is formed on a diaphragm formed in the semiconductor base plate;

wherein the first, second, third and fourth temperature sensitive resistors have the same resistance-temperature coefficient; and the second temperature sensitive resistor and the fourth temperature sensitive resistor are arranged close to each other in order that the second temperature sensitive resistor and the fourth temperature sensitive resistor are held at the same temperature, or the third temperature sensitive resistor and the fourth temperature sensitive resistor are arranged close to each other in order that the third temperature sensitive resistor and the fourth temperature sensitive resistor are held at the same temperature.

2. A thermal type flow measuring apparatus according to claim 1, wherein the first temperature sensitive resistor is the heat generating resistor.

3. A thermal type flow measuring apparatus according to claim 1, wherein a current value flowing through the heat generating resistor is controlled so that the product of a resistance value of the heat generating resistor and a resistance of the fourth temperature sensitive resistor is held in balance with the product of the resistance value of said third temperature sensitive resistor and a resistance value of the second temperature sensitive resistor.

4. A thermal type flow measuring apparatus according to claim 1, wherein a feedback control circuit for controlling current flowing through the heat generating resistor by detecting a balance change of the bridge circuit is further formed on the substrate.

5. A thermal type flow measuring apparatus according to claim 1, wherein the first, second, third and fourth temperature sensitive resistors are formed of the same material and by the same process.

6. A thermal type flow measuring apparatus according to claim 1, wherein the heat generating resistor is formed on the diaphragm together with the first temperature sensitive resistor.

7. A thermal type flow measuring apparatus according to claim 1, wherein the second temperature sensitive resistor and the fourth temperature sensitive resistor are formed at the outside of the diaphragm.

8. A thermal type flow measuring apparatus according to claim 1, wherein resistors which are arranged at the upstream side and the downstream side of the heat generating resistor are formed on the diaphragm together with the heat generating resistor.

* * * * *